United States Patent
Yoon et al.

(10) Patent No.: US 9,396,213 B2
(45) Date of Patent: Jul. 19, 2016

(54) METHOD FOR PROVIDING KEYWORDS, AND VIDEO APPARATUS APPLYING THE SAME

(75) Inventors: Soo-yeoun Yoon, Suwon-si (KR); Jung-chul Park, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 882 days.

(21) Appl. No.: 12/128,898

(22) Filed: May 29, 2008

(65) Prior Publication Data

US 2009/0177627 A1 Jul. 9, 2009

(30) Foreign Application Priority Data

Jan. 7, 2008 (KR) .................................. 2008-1942

(51) Int. Cl.
*G06F 7/00* (2006.01)
*G06F 17/30* (2006.01)

(52) U.S. Cl.
CPC .... *G06F 17/30265* (2013.01); *G06F 17/30817* (2013.01)

(58) Field of Classification Search
CPC .................. G06F 17/30864; G06F 17/30867; G06F 17/30067; G06F 17/30011; G06F 17/3082; G06F 17/30796; G06F 17/30265; G06F 17/30817; G06Q 30/02
See application file for complete search history.

(56) References Cited

U.S. PATENT DOCUMENTS

| | | | |
|---|---|---|---|
| 5,608,858 A * | 3/1997 | Kurosu et al. ................. | 715/209 |
| 6,335,742 B1 * | 1/2002 | Takemoto ...................... | 715/781 |
| 6,480,841 B1 * | 11/2002 | Higashio et al. | |
| 6,829,368 B2 | 12/2004 | Meyer et al. | |
| 6,941,300 B2 * | 9/2005 | Jensen-Grey ................. | 707/710 |
| 7,353,250 B2 | 4/2008 | Chung et al. | |
| 7,483,879 B2 * | 1/2009 | Chang et al. | |
| 7,734,622 B1 * | 6/2010 | Fitzhugh ........................ | 707/722 |
| 7,778,988 B2 * | 8/2010 | Tateno ........................... | 707/705 |
| 7,797,714 B1 * | 9/2010 | Nagasaka et al. ............... | 725/53 |
| 7,904,452 B2 * | 3/2011 | Kasano et al. ................ | 707/730 |
| 8,631,012 B2 * | 1/2014 | Leblang et al. ............... | 707/741 |
| 2002/0107850 A1 * | 8/2002 | Sugimoto et al. ................. | 707/3 |
| 2003/0078899 A1 * | 4/2003 | Shanahan ......................... | 706/8 |
| 2004/0030490 A1 * | 2/2004 | Hegedus et al. ............... | 701/200 |
| 2004/0249816 A1 * | 12/2004 | Tada ................................ | 707/9 |
| 2005/0004889 A1 * | 1/2005 | Bailey et al. ..................... | 707/1 |
| 2005/0038814 A1 * | 2/2005 | Iyengar ............. | G06F 17/30038 |
| 2005/0165613 A1 * | 7/2005 | Kim .................................. | 705/1 |
| 2005/0185924 A1 * | 8/2005 | Hagiwara et al. ............... | 386/68 |
| 2005/0229224 A1 * | 10/2005 | Matsumoto ............ | H04H 60/13 725/100 |

(Continued)

FOREIGN PATENT DOCUMENTS

| | | |
|---|---|---|
| KR | 1999-85288 | 12/1999 |
| KR | 10-2004-0074623 A | 8/2004 |

(Continued)

*Primary Examiner* — James Trujillo
*Assistant Examiner* — Jessica N Le
(74) *Attorney, Agent, or Firm* — Jefferson IP Law, LLP

(57) ABSTRACT

A method for providing keywords and a video apparatus applying the method are provided. The method for providing keywords includes separating metadata from content, extracting keywords in the content from the metadata, and generating a keyword list using the keywords and images related to the keywords. It is thus possible to display the keywords together with the images related to the keywords, so a user may register desired keywords more conveniently without needing to manually individually input keywords.

16 Claims, 5 Drawing Sheets

(56) References Cited

U.S. PATENT DOCUMENTS

| | | | |
|---|---|---|---|
| 2005/0240590 A1* | 10/2005 | Shimizu et al. | 707/9 |
| 2005/0278379 A1* | 12/2005 | Nakazawa | 707/104.1 |
| 2006/0050183 A1* | 3/2006 | Ohno et al. | 348/722 |
| 2006/0059519 A1* | 3/2006 | Wada et al. | 725/52 |
| 2006/0085819 A1* | 4/2006 | Bruck et al. | 725/52 |
| 2006/0195447 A1 | 8/2006 | Chang | |
| 2006/0235869 A1* | 10/2006 | Nagahashi et al. | 707/102 |
| 2006/0239646 A1* | 10/2006 | Kang | 386/95 |
| 2006/0265417 A1* | 11/2006 | Amato et al. | 707/102 |
| 2006/0265731 A1* | 11/2006 | Matsuda | 725/131 |
| 2006/0271527 A1* | 11/2006 | Kutsumi et al. | 707/3 |
| 2007/0033007 A1* | 2/2007 | Narahara et al. | 704/9 |
| 2007/0033531 A1* | 2/2007 | Marsh | 715/738 |
| 2007/0118508 A1* | 5/2007 | Svendsen | 707/3 |
| 2007/0186241 A1* | 8/2007 | Sugimoto et al. | 725/46 |
| 2007/0198508 A1* | 8/2007 | Yoshimura | 707/5 |
| 2007/0300258 A1* | 12/2007 | O'Connor et al. | 725/44 |
| 2007/0300264 A1* | 12/2007 | Turner | 725/60 |
| 2008/0016092 A1* | 1/2008 | Saito et al. | 707/100 |
| 2008/0059526 A1* | 3/2008 | Murakoshi | 707/104.1 |
| 2008/0077956 A1* | 3/2008 | Morrison et al. | 725/38 |
| 2008/0082497 A1* | 4/2008 | Leblang et al. | 707/3 |
| 2008/0082922 A1* | 4/2008 | Biniak et al. | 715/719 |
| 2008/0086754 A1* | 4/2008 | Chen et al. | 725/105 |
| 2008/0133452 A1* | 6/2008 | Nakagawa | 707/1 |
| 2008/0140608 A1* | 6/2008 | Takahashi et al. | 707/2 |
| 2008/0155627 A1* | 6/2008 | O'Connor | H04N 7/173 725/109 |
| 2008/0162469 A1* | 7/2008 | Terayoko et al. | 707/5 |
| 2008/0204595 A1* | 8/2008 | Rathod et al. | 348/465 |
| 2008/0208839 A1* | 8/2008 | Sheshagiri et al. | 707/5 |
| 2008/0215526 A1* | 9/2008 | Takagi | 707/1 |
| 2008/0222095 A1* | 9/2008 | Il | 707/3 |
| 2008/0235275 A1* | 9/2008 | Tanaka et al. | 707/104.1 |
| 2008/0243842 A1* | 10/2008 | Liang et al. | 707/6 |
| 2008/0248681 A1* | 10/2008 | Boensch et al. | 439/404 |
| 2008/0260253 A1* | 10/2008 | Miyazaki | 382/190 |
| 2008/0306967 A1* | 12/2008 | Fukuda et al. | 707/10 |
| 2008/0313146 A1* | 12/2008 | Wong et al. | 707/3 |
| 2008/0320546 A1* | 12/2008 | Moon et al. | 725/136 |
| 2009/0055742 A1* | 2/2009 | Nordhagen | 715/716 |
| 2009/0063419 A1* | 3/2009 | Nurminen et al. | 707/3 |
| 2009/0070386 A1* | 3/2009 | Yamanashi | 707/200 |
| 2009/0092340 A1* | 4/2009 | Arguelles | 382/306 |
| 2009/0112830 A1* | 4/2009 | Denoue et al. | 707/4 |
| 2009/0144768 A1* | 6/2009 | Nagaraja | 725/39 |
| 2009/0150425 A1* | 6/2009 | Bedingfield, Sr. | 707/102 |
| 2009/0228921 A1* | 9/2009 | Miki | H04N 5/44543 725/38 |
| 2009/0234798 A1* | 9/2009 | Shibata | 707/1 |
| 2010/0169929 A1 | 7/2010 | Choi et al. | |
| 2011/0010667 A1* | 1/2011 | Sakai et al. | 715/810 |
| 2014/0115441 A1* | 4/2014 | Badoiu et al. | 715/230 |

FOREIGN PATENT DOCUMENTS

| | | |
|---|---|---|
| KR | 2006-95629 | 1/2006 |
| KR | 10-2007-0096396 A | 10/2007 |

* cited by examiner

METHOD FOR PROVIDING KEYWORDS, AND VIDEO APPARATUS APPLYING THE SAME

CROSS-REFERENCE TO RELATED APPLICATION

This application claims the benefit of Korean Application No. 2008-1942, filed Jan. 7, 2008 in the Korean Intellectual Property Office, the disclosure of which is incorporated herein by reference.

BACKGROUND OF THE INVENTION

1. Field of the Invention

Aspects of the present invention relate to a method for providing content information, and a video apparatus applying the method, and more particularly, to a method for providing keywords and a video apparatus applying the method.

2. Description of the Related Art

Video apparatuses play back or record broadcasts, video recorded on recording media or video received from external sources. The recent rapid development of video processing and broadcasting technologies has led to an increase in the range of content. Additionally, as a result of the emergence of digital televisions (DTVs) and Internet televisions, users may be provided with a wide variety of multimedia content by television.

Since a wide variety of content is provided, users need to register favorite keywords in order to easily search for and select desired content. In order to register keywords, users may input characters corresponding to the keywords, but inputting characters using remote controls of televisions may result in user inconvenience. Additionally, users need to know appropriate keywords for whatever they desire to register, but when a person or location viewed on televisions is not identified in content, it may be difficult for users to input appropriate keywords.

SUMMARY OF THE INVENTION

Aspects of the present invention relate to a method for providing keywords by extracting keywords from metadata regarding content and displaying a keyword list including the keywords and images associated with the keywords so that a user may register keywords more easily, and to a video apparatus applying the same.

According to an exemplary embodiment of the present invention, there is provided a method for providing keywords, the method including separating metadata from content, extracting keywords in the content from the metadata, and generating a keyword list using the keywords and images related to the keywords.

According to an aspect of the present invention, the generating the keyword list may include determining whether the images related to the keywords have been stored previously; and if it is determined that the images related to the keywords have been stored previously, generating a keyword list using the keywords and the previously stored images.

According to an aspect of the present invention, the method may further include determining whether there is a connection to a network, if it is determined that the images related to the keywords have not been stored previously; and searching for the images related to the keywords from the network.

According to an aspect of the present invention, the generating the keyword list may further include generating a keyword list using the keywords and the images found as a result of searching.

According to an aspect of the present invention, the generating the keyword list may further include generating a keyword list using the keywords and using icons previously stored instead of the images related to the keywords, if it is determined that there is no connection to the network.

According to an aspect of the present invention, the content may be broadcasting content.

According to an aspect of the present invention, the keyword list may include a plurality of items, each of which includes a keyword matched one to one to an image related to the keyword.

According to an aspect of the present invention, the method may further include displaying the keyword list; and if a command to register at least one keyword selected from the displayed keyword list is input, registering the selected keyword together with an image related to the selected keyword.

According to another exemplary embodiment of the present invention, there is provided a video apparatus, including a keyword extracting unit to extract keywords in content currently played back, an image storage unit to store images, an image search unit to search for images from the image storage unit related to the keywords received from the keyword extracting unit, and a keyword list generator to generate a keyword list using the keywords received from the keyword extracting unit and using the images received as a result of the search from the image search unit.

According to an aspect of the present invention, the video apparatus may further include an interface connected to an Internet protocol network.

According to an aspect of the present invention, if it is determined that the images related to the keywords are not stored in the image storage unit, the image search unit may determine whether the interface is connected to a network; and if it is determined that the interface is connected to the network, the image search unit may search for the images related to the keywords from the network.

According to an aspect of the present invention, if it is determined that the interface is not connected to the network, the image search unit may search for icons previously stored in the image storage unit instead of the images related to the keywords.

According to an aspect of the present invention, the content may be broadcasting content.

According to an aspect of the present invention, the keyword list may include a plurality of items, each of which includes a keyword matched one to one to an image related to the keyword.

According to an aspect of the present invention, the video apparatus may further include a display, and a controller to display the keyword list on the display, if a specific user command is input.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
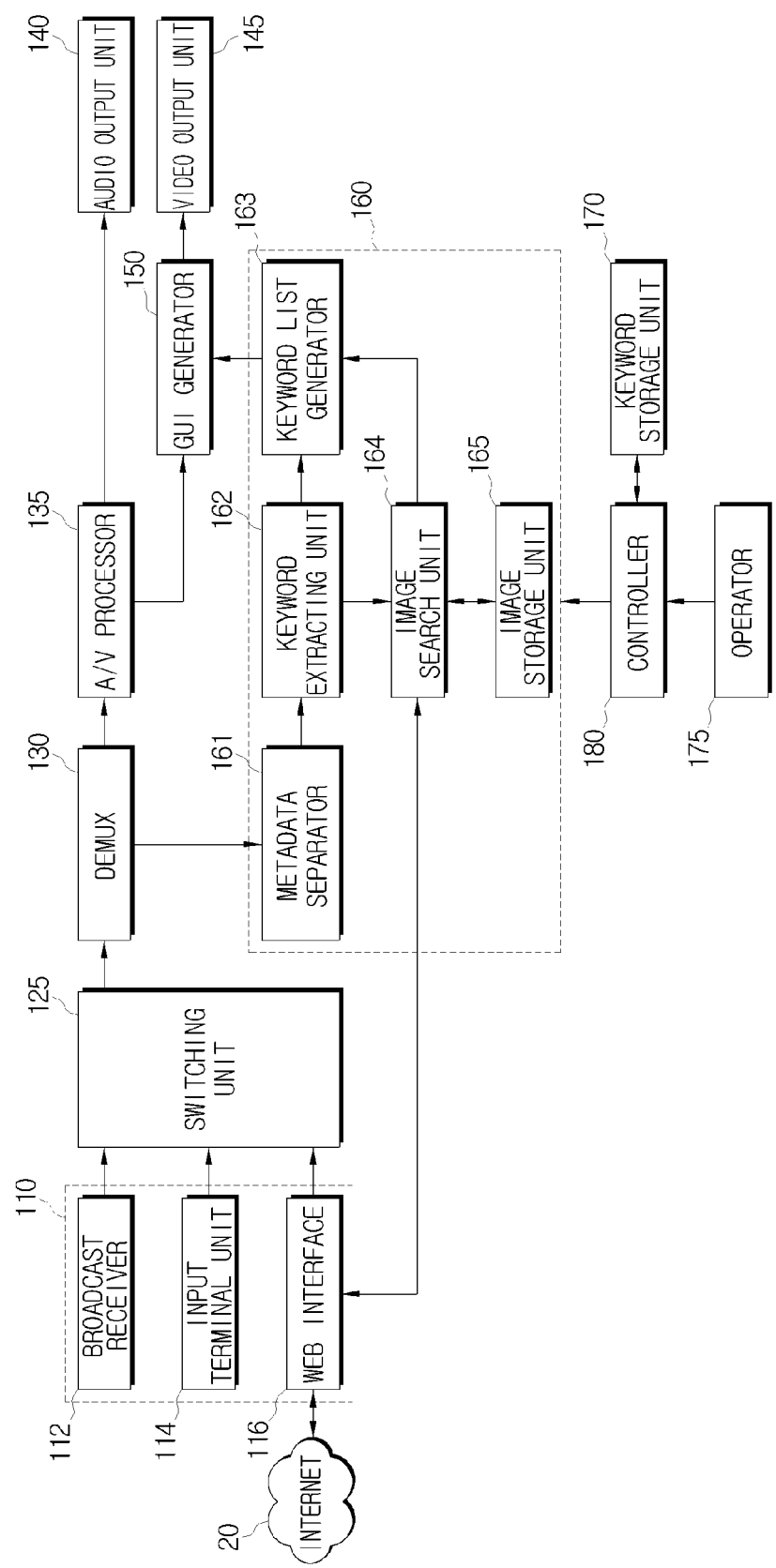
FIG. 1 is a block diagram of a broadcast receiving apparatus according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a broadcast receiving apparatus according to an exemplary embodiment of the present invention. The broadcast receiving apparatus of FIG. 1 is one kind of video apparatus, and includes a content providing unit 110, a switching unit 125, a demultiplexer (DEMUX) 130, an audio/video (A/V) processor 135, an audio output unit 140, a video output unit 145, a graphical user interface (GUI) generator 150, a keyword providing unit 160, a keyword storage unit 170, an operator 175 and a controller 180. While not shown, it is understood that the apparatus can include additional elements, such as a memory to store video and/or audio for later playback, as in the case of a DVR.

The content providing unit 110 provides content to be played back by the broadcast receiving apparatus. The content providing unit 110 includes a broadcast receiver 112, an input terminal unit 114 and a web interface 116. The broadcast receiver 112 tunes to a TV broadcast, and demodulates the tuned broadcast. The broadcast can be received over the air, through a wired connection, and/or through a satellite connection. The input terminal unit 114 provides a terminal which enables an external apparatus to be connected communicably to the input terminal unit 114. The external apparatus connected to the input terminal unit 114 may be a camera, a camcorder, a digital versatile disc (DVD) player, a Blu-ray (BD) player, a personal multimedia player (PMP), a hard disc drive (HDD) player, a universal serial bus (USB) memory or a memory card, but is not limited thereto. Accordingly, any apparatus including a recording medium for recording video may be used as an external apparatus. The input terminal unit 114 is connected to the external apparatus via a cable or wirelessly. The web interface 116 is connected to an Internet protocol network to provide content found on the web using a wired and/or wireless connection. Here, the web may be World Wide Web or Internet, or network. Further, the interface 116 can connect to a computer on a network to enable sharing of content between the computer and the broadcast receiving apparatus.

The switching unit 125 performs switching operations so that the output from one of the broadcast receiver 112, input terminal unit 114 and web interface 116 is transferred to the DEMUX 130. The switching operations of the switching unit 125 are controlled by the controller 180. While not limited thereto, the controller 180 can be one or more processors, and/or can be a general or special purpose computer programmed to control operations of the broadcast receiving apparatus.

The DEMUX 130 divides the content provided by the content providing unit 110 into main content which is required to be played back, and sub-content which may be selectively played back. The DEMUX 130 then transfers the main content to the A/V processor 135 and the sub-content to a metadata separator 161 of the keyword providing unit 160.

Here, main content refers to content that can be played back even when a user enters only a content playback command without any additional playback command. The sub-content refers to content that can be played back when the user inputs not only the content playback command but also an additional playback command. For example, the sub-content may include metadata contained in broadcast signals. Additionally, if the main content is video photographed by the user, the sub-content may be additional information added by the user, such as information on the date the photograph was taken, an album in which the photograph is grouped or information on a photographed location. Similarly, if the main content is audio only, the sub-content can be artist names, producers, album names, lyrics, etc.

The A/V processor 135 performs signal processing, such as video decoding, video scaling, audio decoding or the like, so that the main content received from the DEMUX 130 is able to be played back. Additionally, the A/V processor 135 transmits video signals and audio signals to the GUI generator 150 and the audio output unit 140, respectively.

The audio output unit 140 may output audio signals transmitted from the A/V processor 135 through a speaker (not shown), or may output audio signals to an external device (for example, an external speaker) which is connected through an external output terminal.

The GUI generator 150 generates a graphical user interface (GUI) that will be provided to a user. By way of example, the GUI generator 150 may generate a GUI for configuring an electronic program guide (EPG) screen using the received sub-content or a GUI for displaying a keyword list, and may add the generated GUI to video output from the A/V processor 135. Additionally, the GUI generator 150 may generate a GUI used for generating channels, selecting channels or selecting content obtained by search. Also, the GUI generator 150 may generate a GUI to review stored material on the apparatus and/or on a device connected to the apparatus.

The video output unit 145 may display the video output from the A/V processor 135 on a display (not shown), or may output the video to an external device (for example, an external display) which is connected through an external output terminal. While shown as separate, it is understood that the output units 140, 145 can be combined, such as in an HDMI connection.

The keyword providing unit 160 provides keywords related to the played-back content. The keyword providing unit 160 includes a metadata separator 161, a keyword extracting unit 162, a keyword list generator 163, an image search unit 164 and an image storage unit 165. While not required, the separator 161 and units 162, 164 and the generator 163 can be implemented using one of a collection of processors encoded with firmware or via a computer using software.

The metadata separator 161 separates metadata from the sub-content output from the DEMUX 130. The metadata refers to data to describe played-back content, and the metadata may be selectively played back in response to a user playback command without needing to be played back together with the content.

The keyword extracting unit 162 extracts keywords in the main content using the metadata received from the metadata separator 161. The metadata is used to describe played-back content, and may be formed from a sentence or a collection of words. The keyword extracting unit 162 may extract keywords in order to provide the user with information on the played-back content more rapidly. For example, the keyword extracting unit 162 may extract terms stored with the played-back content, such as the name, actor and writer of a program, the location at which the content was photographed or the theme of the main content, to use as keywords from the metadata. Additionally, the keyword extracting unit 162 may extract terms, which occur frequently in the metadata, as keywords, and may transfer the extracted keywords to the keyword list generator 163 and image search unit 164.

The image search unit 164 determines whether images associated with the keywords received from the keyword extracting unit 162 are stored in the image storage unit 165. If it is determined that the images are stored in the image storage unit 165, the image search unit 164 reads the images and transfers the read images to the keyword list generator 163.

Alternatively, if it is determined that the images are not stored in the image storage unit 165, the image search unit 164 determines whether the web interface 116 is connected to the Internet protocol network. If it is determined that the web interface 116 is connected to the Internet protocol network, the image search unit 164 searches for the images from the web. The image search unit 164 may then store the images found as a result of the search in the image storage unit 165 or may transfer the images found as a result of the search to the keyword list generator 163. While not limited thereto, such a search can be through a site designated by the manufacturer or user, through a site related to a supplier of the main data, through a commercial database of images, through online search engines such as Google and Yahoo, or through sites specified in the metadata. Further, the network is not specifically limited to a type of network, and can connected to the internet using wired connections (such as a LAN) or through wireless connections (such as WiFi).

When the image search unit 164 searches for the images related to the keywords from the web, one image or a plurality of images may be obtained as a result of the search. If a plurality of images are found as a result of the search, the image search unit 164 sorts images having a resolution higher than a predetermined resolution from the plurality of images, and secondly sorts images comprising a small number of objects from the images that have been first sorted. For example, images in which a single person is shown or the most recent photographs may desirably be selected first from the images. Accordingly, the image search unit 164 may search for the images in the above-described way, and may store the obtained images in the image storage unit 165. However, it is understood that other mechanisms can be used to sort the images, such as download popularity and/or user recommendations.

The keyword list generator 163 matches the keywords extracted by the keyword extracting unit 162 to the images obtained by the image search unit 164, one to one, to generate a keyword list and transfer the keyword list to the GUI generator 150. The keyword list may include not only text but also images as keyword icons.

The keyword storage unit 170 refers to space in which keywords registered by the user are stored. While shown as separate, it is understood that the image storage unit 165 and the keyword storage unit 170 can be implemented in a single memory, or can be separate memories.

The operator 175 receives user operating commands and transmits the user operating commands to the controller 180. The operator 175 may be provided integrally with or separately from the broadcast receiving apparatus. The operator 175 may be implemented as a user interface through which a user can enter the commands using a menu screen. Additionally, the operator 175 may also be implemented as a remote controller with which a user may input the operating commands, or a light receiver which receives an output signal of the remote controller and transmits the signal to the controller 180. According to the exemplary embodiment of the present invention, the operator 175 is a remote controller separated from the broadcast receiving apparatus to receive user commands.

The controller 180 determines the user operating commands entered through the operator 175, and controls the operation of the broadcast receiving apparatus according to the user operating commands. For example, if the user inputs a keyword registration command while content is being played back, the controller 180 controls various function blocks of the broadcast receiving apparatus so that the keyword list is displayed on one area of the display. Additionally, if the user enters a command to select a certain item from the keyword list, the controller 180 controls the function blocks so that a selection indication appears on the selected item and that the selected item is stored in the keyword storage unit 170. Further, the controller 180 can block certain images from being displayed on the list, such as where an image is retrieved from a website having objectionable content.

Figure 2:
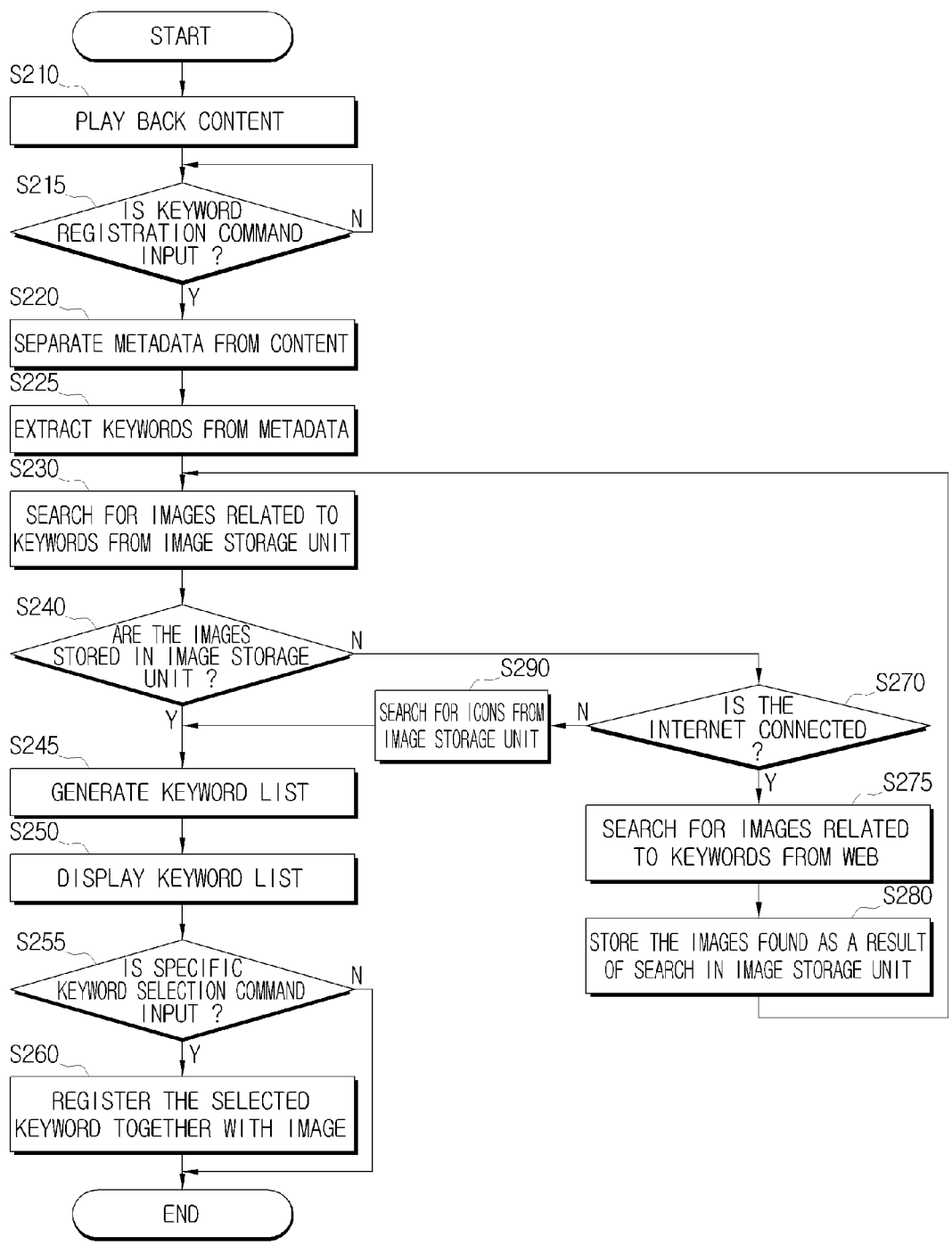
FIG. 2 is a flowchart illustrating a process for registering keywords during playback of content according to an exemplary embodiment of the present invention.

FIG. 2 is a flowchart illustrating a process for registering keywords during playback of content, according to an exemplary embodiment of the present invention. The broadcast receiving apparatus plays back content in operation S210. Specifically, if the content is a broadcast signal, the broadcast receiver 112 receives the broadcast signal, and the DEMUX 130 then divides the broadcast signal into main content and sub-content, transfers the main content to the A/V processor 135, and transfers the sub-content to the metadata separator 161. The A/V processor 135 processes the received main content to form playable audio and video signals, and transfers the audio and video signals to the audio output unit 140 and video output unit 145, respectively, and content can thus be played back.

The controller 180 determines whether the keyword registration command is input in operation S215. In this command, the user may input the keyword registration command by pressing a keyword registration key included in the remote controller, and accordingly the controller 180 may determine that the keyword registration command is input.

If no command is received in operation 215-N, the controller 180 returns to operation S215 to wait for the command. If it is determined that the keyword registration command is input in operation S215-Y, the metadata separator 161 separates metadata from the sub-content received from the DEMUX 130 in operation S220. Specifically, if the metadata is contained in the sub-content, the metadata separator 161 separates the metadata from the sub-content and transfers the separated metadata to the keyword extracting unit 162.

The keyword extracting unit 162 extracts keywords from the metadata in operation S225. In more detail, the keyword extracting unit 162 extracts keywords (such as the name, director and writer of a program or the location at which the content was photographed, from the metadata), and transfers the extracted keywords to the keyword list generator 163 and image search unit 164.

The image search unit 164 searches for images related to the keywords from the image storage unit 165 in operation S230. As a result of the search, if it is determined that the images related to the keywords are stored in the image storage unit 165 in operation S240-Y, the image search unit 164 reads the images and transfers the read images to the keyword list generator 163. The keyword list generator 163 then matches the keywords extracted by the keyword extracting unit 162 to the images acquired by the image search unit 164, one to one, and generates a keyword list in operation S245. Subsequently, the GUI generator 150 combines the generated keyword list with the content and displays the content combined with the keyword list and is output through the video output unit 145 for display on the display (not shown) in operation S250.

The controller 180 determines whether a specific keyword selection command is received in operation S255. In more detail, the user may select an item which he desires to register as a keyword using the keyword list displayed on the display. Accordingly, the controller 180 may determine that the keyword selection command is received in operation 255-Y. If no command is received, the controller 180 returns to operation S255 to wait for the command in operation S255-N.

The controller 180 then registers the keyword selected by the user and an image related to the keyword in the keyword storage unit 170 in operation S260.

Alternatively, if it is determined that the images related to the keywords are not stored in the image storage unit 165 in operation S240-N, the image search unit 164 determines whether the web interface 116 is connected to the Internet protocol network in operation S270.

If it is determined that the web interface 116 is connected to the Internet protocol network in operation S270-Y, the image search unit 164 searches for the images from the web in operation S275, and stores the images found as a result of the search in the image storage unit 165 in operation S280. The controller 180 then returns to operation S230 to allow a search from the image storage unit 165.

If it is determined that the web interface 116 is not connected to the Internet protocol network in operation S270-N, the image search unit 164 searches for icons previously stored in the image storage unit 165 and transfers the icons found as a result of the search to the keyword list generator 163 in operation S290.

As described above, the keywords describing the played-back content may be extracted from the metadata of the content, so the user does not need to manually input keywords. Accordingly, even when the user does not know the exact keywords, it is possible to select the keywords more easily. Additionally, images related to the keywords may be displayed together with the keywords, so it is possible to provide a keyword registration screen with superior visual effect.

Figure 3A:
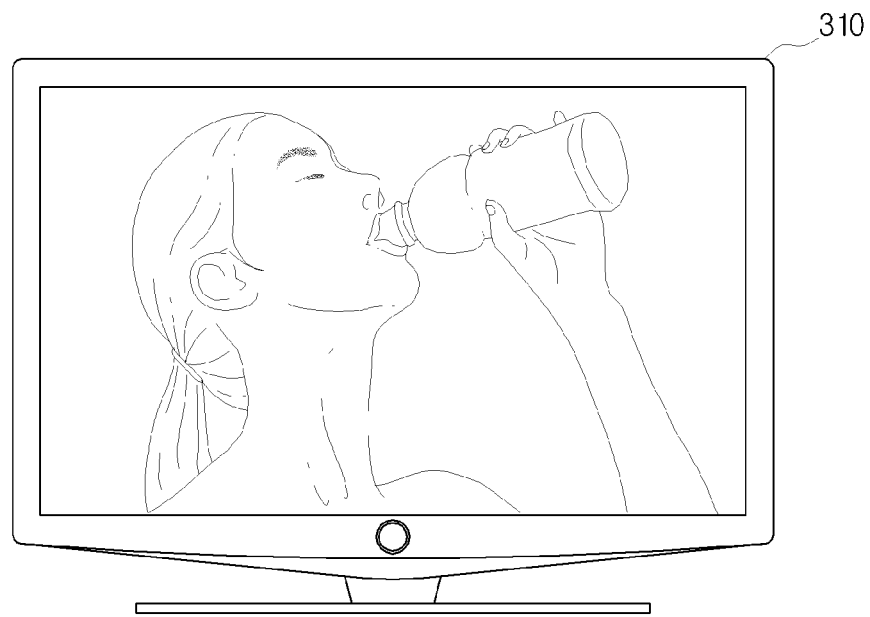
FIGS. 3A to 3C exemplarily illustrate content displayed during the process of registering keywords, according to an exemplary embodiment of the present invention.
Figure 3B:
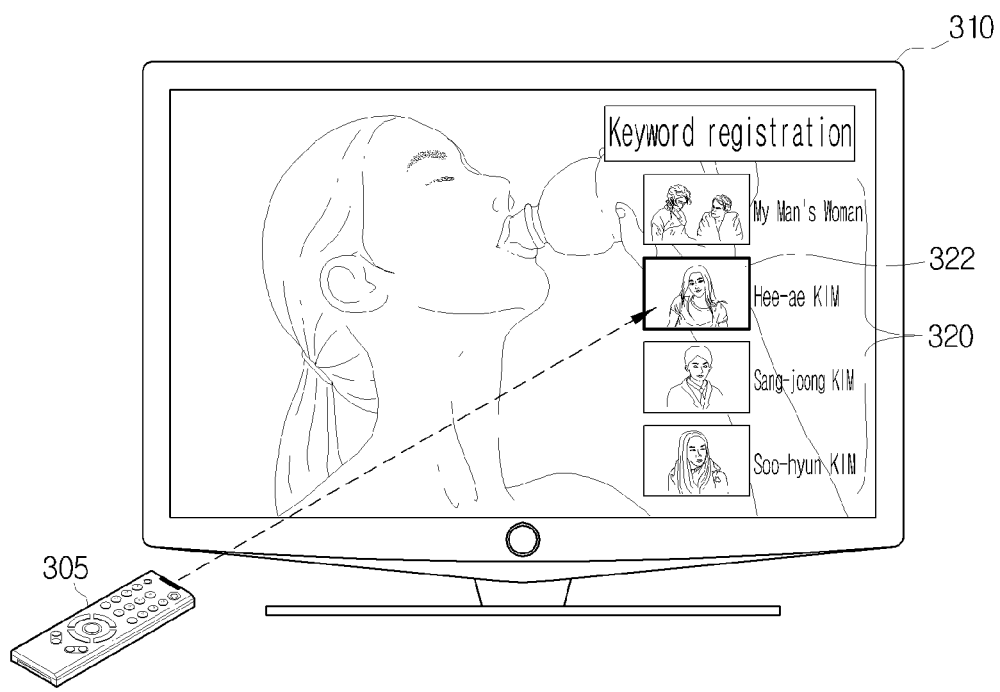
Figure 3C:
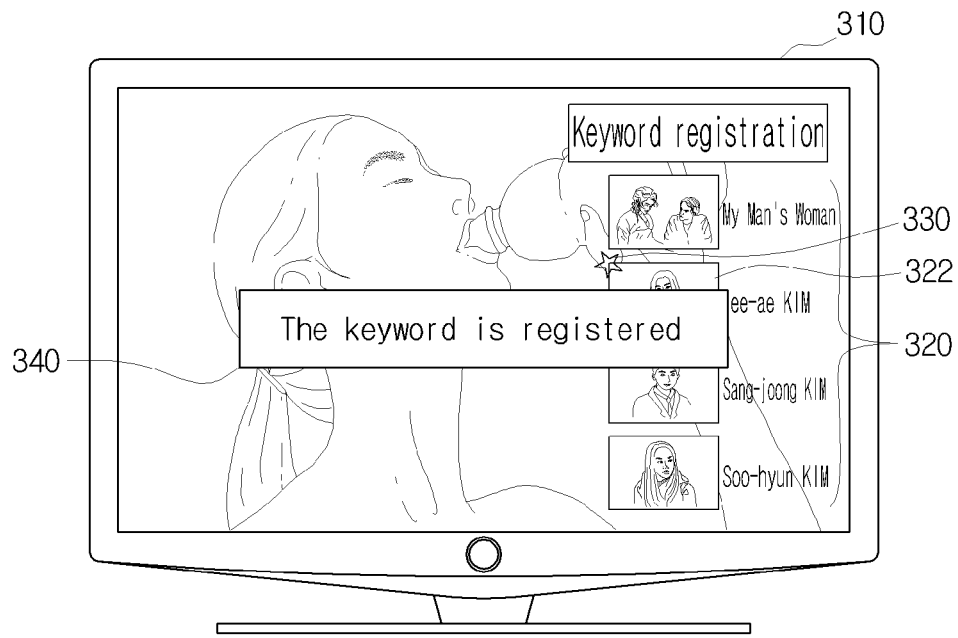

FIGS. 3A to 3C exemplarily illustrate content displayed during the process of registering keywords, according to an exemplary embodiment of the present invention. FIG. 3A illustrates content played back on a display 310. The display 310 includes or is connected to the broadcast receiving apparatus of FIG. 1. If the user presses the keyword registration key of the remote controller 305 (i.e., a type of operator 175), a keyword list 320 is displayed on one area of the display 310, as illustrated in FIG. 3B. The keyword list 320 includes a plurality of items, each of which includes a single keyword and a single image related to the keyword. In this situation, while searching for a desired keyword using up, down, left and right directional keys of the remote controller 305, the user may highlight the desired keyword and press the keyword registration key. As shown, the list 320 includes My Man's Woman, Hee-ae Kim, Sang-joon Kim, and Soo-hyun Kim with associated images.

FIG. 3B exemplarily illustrates a situation in which an item "Hee-ae KIM" 322 is highlighted. While viewing the content, when the user wishes to view other content associated with a specific actor appearing in the currently viewed content, the user may register the name of the actor as a keyword. However, if the user does not know the name of the actor, it is difficult to register the name of the actor as a keyword. Accordingly, in the exemplary embodiment of the present invention, since an image related to a keyword which the user desires to know may be displayed together with the keyword, the user can know the correct name of the actor. Furthermore, even when the user knows the name of the actor, if he manually inputs the name of the actor as a keyword, the name may be input incorrectly. However, in the exemplary embodiment of the present invention, the broadcast receiving apparatus may provide keywords, so exact keywords can be registered more easily.

The user may press the key registration key in order to register the highlighted item "Hee-ae KIM" 322 as a keyword. Subsequently, as shown in FIG. 3C, a message 340 notifying that the keyword is registered may be displayed on the display 310 together with a selection indication 330 indicating the selected item 322. The selection indication 330 is displayed on the keyword list 320, so it is possible to prevent the user from re-registering the keyword that has already been registered for other content.

Figure 4A:
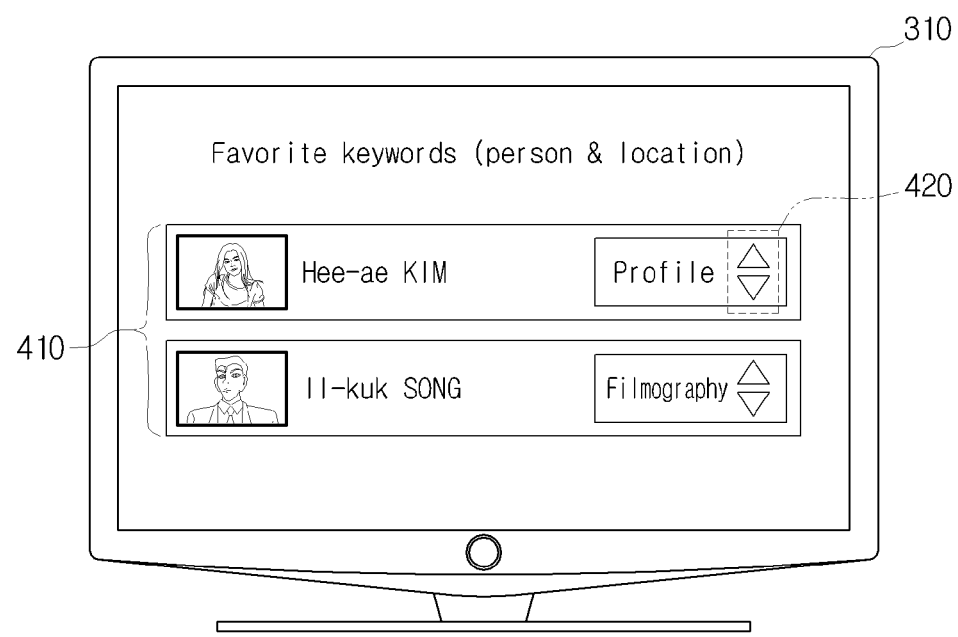
FIGS. 4A to 4B are views illustrating a process using keywords to display information related to the keywords, according to an exemplary embodiment of the present invention.
Figure 4B:
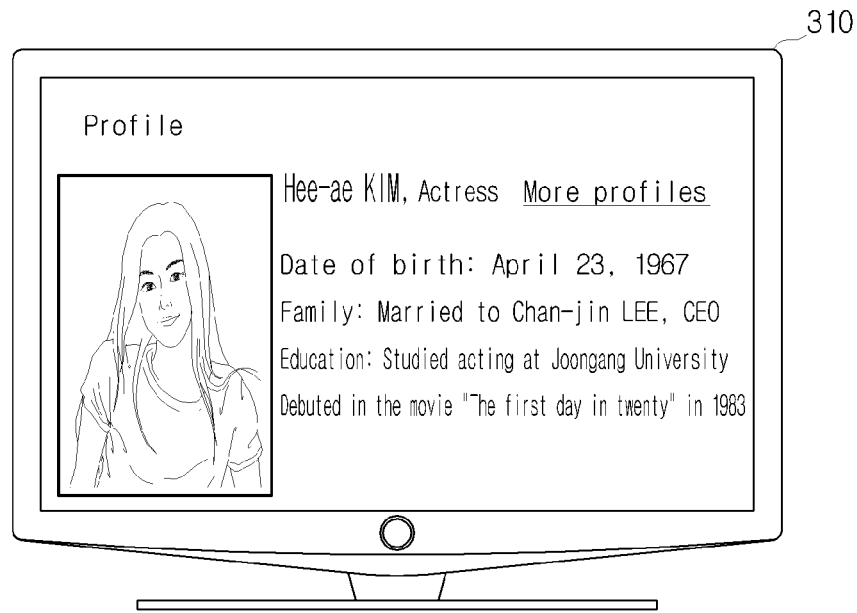

Hereinafter, a process for displaying information related to the registered keywords using the keywords will be described with reference to the drawings. FIGS. 4A to 4B are views illustrating a process using keywords to display information related to the keywords, according to an exemplary embodiment of the present invention. If the user inputs a command to display registered keywords, a list 410 containing the registered keywords is displayed on the display 310, as shown in FIG. 4A. In FIG. 4A, the user registered keywords "Hee-ae KIM" and "Il-kuk SONG". Each of the registered keywords may include a plurality of sub-keywords. The sub-keywords refer to more detailed information associated with the registered keywords. For example, the sub-keywords can be a profile, photo, filmography or articles related to the actor. The user may search for the sub-keywords using an up/down key 420 and may select a sub-keyword which he desires to view. For example, if the user enters a command to select a sub-keyword "profile" from among the plurality of sub-keywords, the profile of Hee-ae KIM may be displayed, as shown in FIG. 4B.

Although not illustrated in the drawings, if the user selects a sub-keyword "filmography" from among the plurality of sub-keywords, a list of works in which Hee-ae Kim has appeared may be displayed. Additionally, if the user selects a certain keyword from the list 410, it is possible to play back a broadcast associated with the selected sub-keyword, to retrieve a stored broadcast, and/or to highlight which films or music are in a user's collection. Accordingly, the user may view content in a wide variety of ways using keywords.

Figure 5:
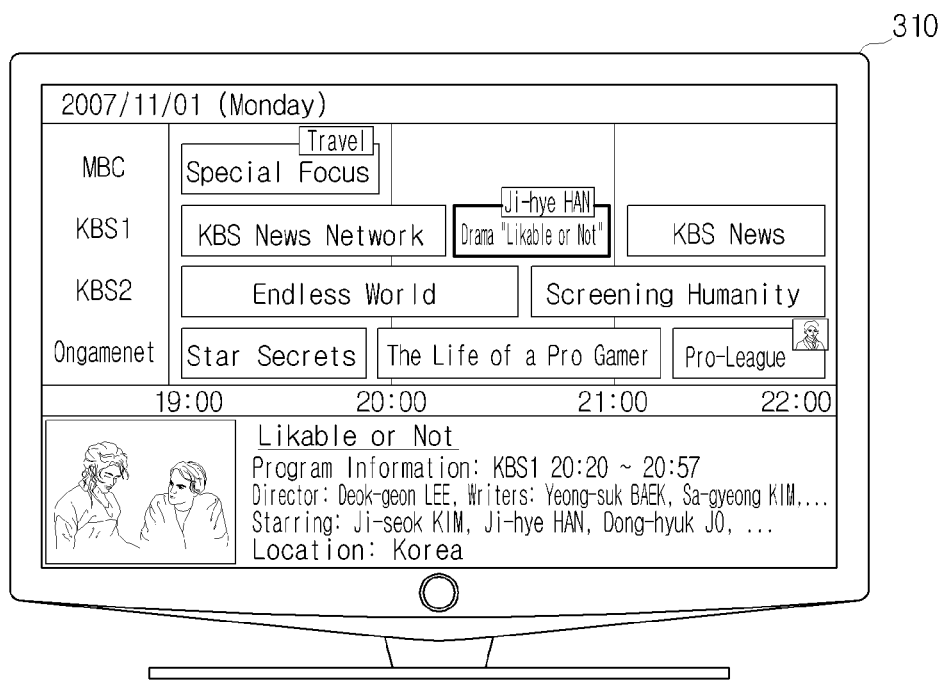
FIG. 5 is a view illustrating a process for differentiating keywords registered in a content list and displaying the content list, according to an exemplary embodiment of the present invention.

FIG. 5 is a view illustrating a process for differentiating keywords registered in a content list and displaying the content list, according to an exemplary embodiment of the present invention. Referring to the content list illustrated in FIG. 5, keywords "Ji-hye HAN" and "Travel" are displayed above the content entitled "Likable or Not" and content "Special Focus", respectively, so the keywords "Ji-hye HAN" and "Travel" are registered in the content list. Accordingly, if the keywords are distinguished and displayed on the content list in the above manner, the user may more easily select desired content while viewing the content list.

Additionally, the user may delete the selected keywords or add new keywords through a keyword editing screen of an on-screen-display (OSD) menu.

Although the operator 175 is separated from a display unit in the video apparatus according to the exemplary embodiment of the present invention, the present invention is also applicable to a touch screen panel in which the operator 175 is combined with the display unit. As such, aspects can be utilized on a portable media player or phone having a touch screen display and/or integrated display and keyboard.

The exemplary embodiment of the present invention described above comprises a video apparatus capable of receiving broadcasting to which the present invention is applicable to provide various content and keywords, but the video apparatus is only an exemplary embodiment for convenience of description. Accordingly, there is no limitation to the type of video apparatus to which the present invention is applicable. Aspects of the present invention can also be embodied as computer readable processing instructions encoded on a computer readable medium. The computer readable medium is any data storage device that can store processing instructions which can be thereafter executed by one or more computers. The present invention can be applied to a portable or non-portable television (TV), a set-top box (STB), Blu-ray recording and/or reproducing apparatus, a digital versatile disc (DVD) player, a DVD recorder, a video cassette recorder (VCR), a multimedia player, a moving picture player, a compact disc (CD) player, a CD recorder, a moving picture experts group-1 audio layer 3 (MP3) player, a mobile phone, a personal media player, a computer having video capabilities, a personal digital assistant (PDA), or an audio system, or a combination system comprising any combination thereof.

As described above, according to the exemplary embodiment of the present invention, keywords relating to played-back content may be extracted and displayed, so the user does not need to manually input individual keywords and user convenience thus increases.

Additionally, keywords may be displayed together with images related to the keywords, so the user can perceive keywords which he would not have been able to use otherwise, while viewing the images, and it is thus possible to register keywords more conveniently.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for providing keywords of a video apparatus, the method comprising:
separating, by a processor, metadata from a first content;
extracting, from the separated metadata, one or more keywords in the first content;
displaying a keyword list including the extracted keywords and images corresponding to the extracted keywords;
receiving a user input to select at least one keyword from the displayed keyword list;
determining whether the images related to the keywords have been stored previously;
determining whether there is a connection to a network; and
generating, in response to determining that there is no connection to the network and that the images related to the keywords have not been stored previously, the keyword list using the keywords and using visual items previously stored instead of the images related to the keywords and searching for the images related to the keywords through the network,
wherein the generating of the keyword list further comprises generating the keyword list using the keywords and the images found during the search, and
wherein the corresponding images are acquired from a second content which is different from the first content where the keywords are extracted.

2. The method of claim 1, further comprising:
generating, in response to determining that the images related to the keywords have been stored previously, the keyword list using the keywords and the previously stored images.

3. The method of claim 1, wherein the first content is broadcasting content.

4. The method of claim 1, wherein the keyword list comprises a plurality of items, each of which comprises a corresponding pair of one of the keywords and one of the images uniquely matched to the keyword.

5. A video apparatus comprising:
a keyword extracting unit configured to extract one or more keywords in a first content currently played back;
an image storage unit configured to store extracted keywords together with images corresponding to the extracted keywords;
an image search unit configured to search for stored images from the image storage unit related to the extracted keywords received from the keyword extracting unit;
a display unit configured to display a keyword list including the extracted keywords and images corresponding to the extracted keywords;
a controller configured to display the keyword list on the display unit upon receiving a user input to select at least one keyword from the displayed keyword list; and
an interface connected to an Internet protocol network,
wherein the corresponding images are acquired from a second content which is different from the first content where the keywords are extracted,
wherein, in response to determining that the interface is not connected to the network, the image search unit searches for visual items previously stored in the image storage unit instead of the images related to the keywords, and
wherein, in response to determining that the images related to the keywords are not stored in the image storage unit, the image search unit determines whether the interface is connected to the network; and in response to determining that the interface is connected to the network, the image search unit searches for the images related to the keywords through the network.

6. The video apparatus of claim 5, wherein the first content is broadcasting content.

7. The video apparatus of claim 5, wherein the keyword list comprises a plurality of items, each of which comprises a corresponding pair of one of the extracted keywords uniquely matched to a corresponding one of images.

8. The video apparatus of claim 5, further comprising:
an input unit through which the first content is received;
a demultiplexer configured to divide the received first content into main content and sub-content;
an audio/video processor configured to process the divided main content to provide video and/or audio data; and
a metadata separator configured to extract metadata from the sub-content, wherein the keyword extracting unit extracts the keywords from the extracted metadata.

9. The video apparatus of claim 8, wherein the video data and the generated keyword list are selectively displayed.

10. The video apparatus of claim 5, further comprising a network interface, wherein the image search unit connects to an external storage device through the network interface to select at least one of the images stored on the external storage device.

11. The video apparatus of claim 10, wherein the external storage device is connected to the network interface via an Internet protocol network.

12. The video apparatus of claim 10, further comprising a local storage unit within the video apparatus, wherein the image search unit selects other ones of the images stored on the local storage unit and selects the at least one of the images stored on the external storage device.

13. The video apparatus of claim 12, wherein the image search unit selects the at least one of the images stored on the external storage device when it is determined that the at least one image is not stored on the local storage unit.

14. A method for providing keywords of a video apparatus, the method comprising:
- extracting one or more keywords, from metadata separated from a first content received at the video apparatus, by a keyword extracting unit, the keywords being descriptive of the first content;
- selecting images corresponding to the extracted keywords;
- displaying a keyword list including the extracted keywords and images corresponding to the extracted keywords; and
- receiving a user input to select at least one keyword from the displayed keyword list, wherein the corresponding images are acquired from a second content which is different from the first content where the keywords are extracted, and wherein the selecting of the images comprises, for each keyword:
- detecting if an image exists on a storage unit of the video apparatus which corresponds to the keyword,
- selecting, when the image exists on the storage unit, the stored image, and
- establishing, when the image does not exist on the storage unit, a network connection to select the image from a storage unit exterior to the video apparatus.

15. The method of claim 14, wherein the first content is retrieved from one or more storage media.

16. A non-transitory computer readable medium encoded with processing instructions for executing the method of claim 14 using one or more computers.

* * * * *